United States Patent
Kuge et al.

(12) 
(10) Patent No.: US 6,243,255 B1
(45) Date of Patent: Jun. 5, 2001

(54) PROCESS FOR PREPARING A NB CAPACITOR

(75) Inventors: Noriko Kuge; Katsuhiro Yoshida; Toshihiko Nishiyama, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/389,489

(22) Filed: Sep. 3, 1999

(30) Foreign Application Priority Data

Sep. 4, 1998 (JP) .................................................. 10-250255

(51) Int. Cl.$^7$ ...................................................... H01G 9/04
(52) U.S. Cl. ............................................ 361/528; 361/524
(58) Field of Search .................................. 361/523, 525, 361/528, 530; 29/25.03

(56) References Cited

U.S. PATENT DOCUMENTS 3,597,664 * 8/1971 Vallani .................................. 361/528
5,471,365 * 11/1995 Nakamura et al. .................. 361/523

FOREIGN PATENT DOCUMENTS 11-329902 * 11/1999 (JP) .

* cited by examiner

*Primary Examiner*—Anthony Dinkins
(74) *Attorney, Agent, or Firm*—Sughrue, Mion, Zinn, Macpeak & Seas, PLLC

(57) ABSTRACT

Process for preparing a solid electrolytic Nb capacitor having dielectric loss (tan δ) whose abnormal frequency characteristics are restrained. The process comprises forming a laminating film or laminating films on a first laminate comprising Nb anode body, Nb-oxide layer and solid electrolyte layer formed on said Nb-oxide layer, which further includes removing absorbed water remained between the Nb-oxide layer and the solid electrolyte layer existed in the first laminate or a second laminate including the first laminate and at least one layer of the laminating film.

7 Claims, 5 Drawing Sheets

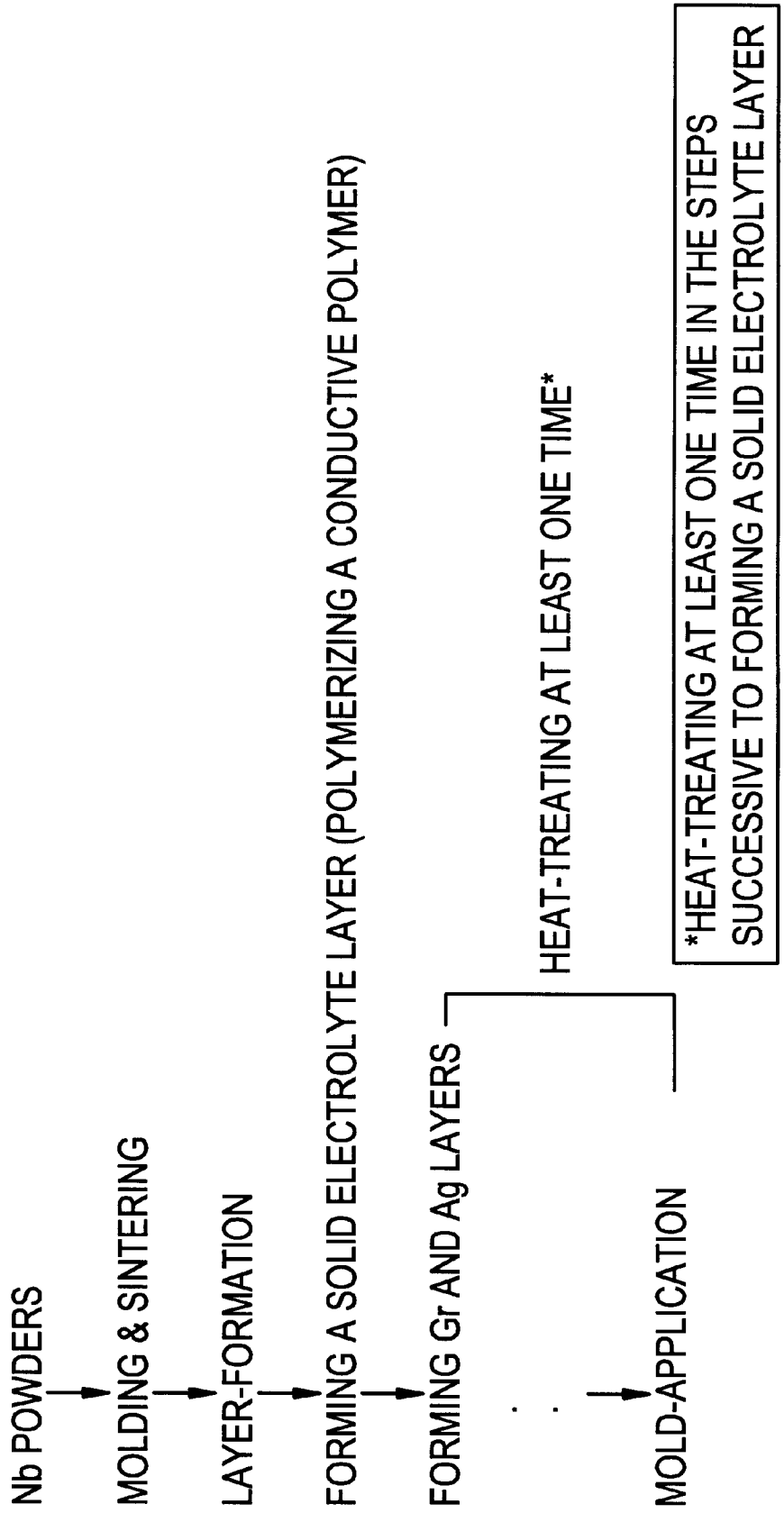

PROCESS FOR PREPARING A NB CAPACITOR

FIELD OF THE INVENTION

The present invention relates to a capacitor (condenser) using Nb and a process for preparing same, more particularly, to a process for preparing a solid electrolytic Nb capacitor.

BACKGROUND OF THE INVENTION

There has been hitherto known a Nb capacitor, more particularly, solid electrolytic Nb capacitor in which Nb (niobium) is used for an anode body. An outline of a typical process for preparing the solid electrolytic Nb capacitor will be explained below step by step.

1) Powder-preparing step

Nb powders are admixed with a liquid binder to granulate secondary Nb particles of coagulated Nb powders. These granulated secondary Nb particles are then sieved to eliminate enormously large mass of coagulated secondary Nb particles, thereby, to obtain secondary Nb particles having a uniform particle size.

2) Compression molding & sintering step

By using the secondary Nb particles having a uniform particle size which was prepared in the above powder-preparing step, an anode body for a capacitor is made. Explaining it more in detail, lead of Nb wire is embedded into the secondary Nb particles. Then, a compression-molded article (-compact) of the secondary Nb particles is prepared. Thereafter, the prepared compression-molded article is sintered in a vacuum of not more than $10^{-5}$ Torr at high temperatures of 1200 to 1300° C. to prepare an anode body for a capacitor.

3) Formation step

On the surface of the anode body for a capacitor prepared in the above compression molding & sintering step, a dielectric of a Nb-oxide layer is formed by an anodic oxidation process. The anodic oxidation process is a process for forming an oxide layer on the surface of an anode body by immersing anode body and its counter electrode in an electrolytic solution and maintaining the anode body at an electrostatic potential higher than that of a counter electrode. Using, for example, an aqueous solution containing 0.6% by volume of phosphoric acid as an electrolytic solution, the anodic oxidation is carried out with keeping its liquid temperature at 60° C.

4) Solid-electrolyte-layer-forming step

On the dielectric, i.e., the oxide layer of Nb, a solid electrolyte layer is formed. The solid electrolyte layer is formed by polymerizing a conductive polymer such as polypyrrole or the like.

4) Steps of forming graphite and Ag layers to mold-application After forming the solid electrolyte layer, graphite and Ag layers are formed on the thus formed solid electrolyte layer in this order. Then, the thus obtained laminate is subjected to mold-application.

SUMMARY OF THE DISCLOSURE

In the course of investigations toward the present invention the following problems have been encountered.

It was found that the solid electrolytic Nb capacitor prepared by the above conventional process has such drawbacks that abnormal behavior is observed on the frequency response of its dielectric loss (tan δ). For example, it is shown in FIG. 2(a).

Accordingly, it is an object of the present invention to provide a solid electrolytic Nb capacitor whose abnormal dielectric loss (tan δ) behavior is restrained which has been observed previously dependent on the amplitude of frequency, and a process for preparing same.

According to an aspect of the present invention, there is provided a process for preparing a solid electrolytic Nb capacitor that the solid electrolytic Nb capacitor is obtained by forming a laminating film or laminating films on a first laminate comprising a Nb anode body, a Nb-oxide layer and a solid electrolyte layer formed on the Nb-oxide layer. The process of the present invention further comprises the step of removing absorbed water remained between the Nb-oxide layer and the sol id electrolyte layer existing in the first laminate or a second laminate which includes the aforementioned first laminate and one or more layer of the laminating film.

According to a second aspect of the present invention, there is provided a solid electrolytic Nb capacitor prepared by the process of the present invention. In the solid electrolytic Nb capacitor of the present invention, absorbed water is removed which remained between the Nb-oxide layer and the solid electrolyte layer. In a further aspect of the present invention, a solid electrolytic Nb capacitor comprises a Nb anode body, a Nb-oxide layer and a solid electrolyte layer formed on the Nb-oxide layer, and is substantially freed from any water absorbed on the Nb-oxide layer between the Nb-oxide layer and the solid electrolyte layer.

BRIEF DESCRIPTION OF DRAWINGS

FIG. 1 is a flow chart of a process for preparing a solid electrolytic capacitor of Example 1 of the present invention.

PREFERRED EMBODIMENTS OF THE INVENTION

Figure 2A:
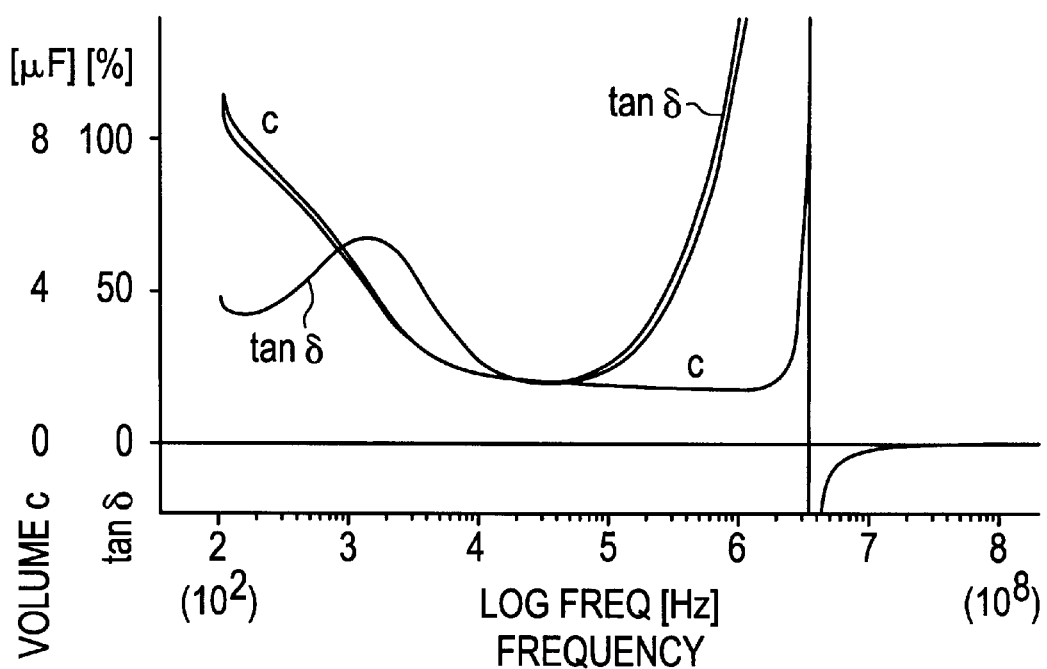
FIG. 2(a) is a graph showing changes dependent on frequency in capacity and tan δ of a Nb capacitor prepared by a conventional preparing process in which no heat treatment was done at temperatures not less than 200° C. after preparing a solid electrolyte layer.

It is considered on the basis of the present inventors' findings that the abnormal behavior on the frequency response of dielectric loss (tan δ) observed in the solid electrolytic Nb capacitor prepared by the conventional process is caused by the absorption of water on the interface between the Nb-oxide layer film and the solid electrolyte layer. Namely, it is observed such phenomenon that the water is changed to form a dipole, and accordingly, that permittivity or dielectric constant is greatly changed by applying certain frequency from outside. Generally, this phenomenon is cal led "dielectric dispersion". At this time, the abnormal behavior on the frequency characteristics of dielectric loss (tan δ) is observed.

Accordingly, the abnormal behavior on the frequency response of dielectric loss (tan δ) is restrained and electrostatic capacity is stabilized in the solid electrolytic Nb capacitor after manufacture, by removing absorbed water remained between Nb-oxide layer and solid electrolyte layer (hereinafter referred to as "absorbed water") in a first laminate including a Nb anode body, the Nb-oxide layer and the solid electrolyte layer formed on the Nb-oxide layer (hereinafter referred to as "first laminate") or in a second laminate including the first laminate and at least one layer of a laminating film (hereinafter referred to as "second laminate"), preferably, by removing water adsorbed on the Nb-oxide layer.

It is preferred that the absorbed water is removed by heat-treating the first or second laminate. The second laminate includes, for example, a laminate including the first laminate and graphite layer formed on the surface thereof, or a laminate including this laminate and a further metal-containing layer formed on the graphite layer. Exemplary metal contained in the metal-containing layer is silver and the like.

The first or second laminate is heat-treated preferably at temperatures not less than 200° C., more preferably, from 200 to 240° C. The heat treatment at temperatures not less than 200° C. makes it possible to remove the absorbed water effectively.

The first or second laminate is heat-treated in a low moisture atmosphere, for example, in low moisture nitrogen. The heat treatment in a low moisture atmosphere at temperatures not less than 200° C. makes it possible to remove the absorbed water more effectively.

The first laminate can be prepared, for example, by a process including a step of granulating (enlarging the size of) Nb powders into secondary Nb particles, a step of compression-molding the secondary Nb particles to obtain a compression-molded article (compact), a step of sintering the compression-molded article of the secondary Nb particles to form a Nb anode body, a step of forming a Nb-oxide layer on the Nb anode body, and a step of forming a solid electrolyte layer on the Nb-oxide layer formed on the Nb anode body.

EXAMPLES

Concrete examples of the present invention will be explained below in order to explain the present invention as exemplified in the above embodiment more in detail. In the following examples, "Nb capacitor" means a solid electrolytic capacitor in which Nb is used for its anode body; "Ta capacitor", a solid electrolytic capacitor in which Ta is used for its anode body.

Example 1

Constitution of Example 1

This example explains a process for preparing an electrolytic capacitor in which Nb is used for its anode body. A flow chart of the preparing process is illustrated in FIG. 1. The illustrated process is characterized by introducing heat treatment for removing absorbed water remained between Nb-oxide layer and solid electrolyte layer in any one of steps starting from the subsequent step to forming the solid electrolyte layer and ending in mold-application. Each of the steps will be explained below.

1) Powder-preparing step

Nb powders are admixed with a liquid binder to granulate secondary Nb particles of coagulated Nb powders. These granulated secondary Nb particles are then sieved to eliminate enormously large mass of coagulated secondary Nb particles, thereby, to obtain secondary Nb particles having a uniform particle size.

2) Compression molding & sintering step

By using the secondary Nb particles having a uniform particle size which were prepared in the above powder-preparing step, an anode body for a capacitor is manufactured. Explaining it more in detail, lead of Nb wire is embedded into the secondary Nb particles. Then, a compression-molded article of the secondary Nb particles is prepared. Thereafter, the prepared compression-molded article is sintered in a vacuum of not more than $10^{-5}$ Torr at high temperatures of 1200 to 1300° C. to prepare an anode body for a capacitor.

3) Formation step

On the surface of the anode body for a capacitor prepared in the above compression molding & sintering step, a dielectric of a Nb-oxide layer is formed by an anodic oxidation process. The anodic oxidation process is a process for forming an oxide layer on the surface of an anode body by immersing anode body and its counter electrode in an electrolytic solution and maintaining the anode body at electrostatic potentials higher than those of the counter electrode. In this example, the anodic oxidation is carried out keeping its liquid temperature at 60° C. by using an aqueous solution containing 0.6% by volume of phosphoric acid as an electrolytic solution.

4) Solid-electrolyte-layer-forming step

On the dielectric, i.e., the oxide layer of Nb formed in the preceding formation step, a solid electrolyte layer is formed. In this example, the solid electrolyte layer is formed by polymerizing a conductive polymer of polypyrrole (Ppy).

5) Heat-treating step for removing absorbed water remained between Nb-oxide layer and solid electrolyte layer The absorbed water remained between the Nb-oxide layer and the solid electrolyte layer can be removed by heat treatment. Usually, the absorbed water can be removed by heat-treating after forming the solid electrolyte layer on the Nb-oxide layer. After forming the solid electrolyte layer, graphite and Ag layers are formed successively to obtain a Nb capacitor. The thus obtained Nb capacitor is then subjected to mold-application by resin. In the above step, the Ag layer can be formed by, for example, curing an Ag paste by means of heating and etc.

The heat treatment is practiced at least one time during the steps starting from the subsequent step to forming the solid electrolyte layer and ending in the mold-application to remove the absorbed water remained between the Nb-oxide layer and the solid electrolyte layer formed on the Nb anode body. This heat treatment is instantly carried out in the air at temperatures ranging from 200 to 240° C.

Explanation of Operation Performed in Example 1

Heat treatment which is a feature of the present invention will be explained below. This heat treatment is performed by blowing hot air to a Nb capacitor after or on the way of preparing the same. It is considered that the absorbed water remained at the interface between Nb-oxide film, which is the Nb-oxide layer, and the solid electrolyte layer.

Explanation of Effects Taken by Example 1

Figure 2B:
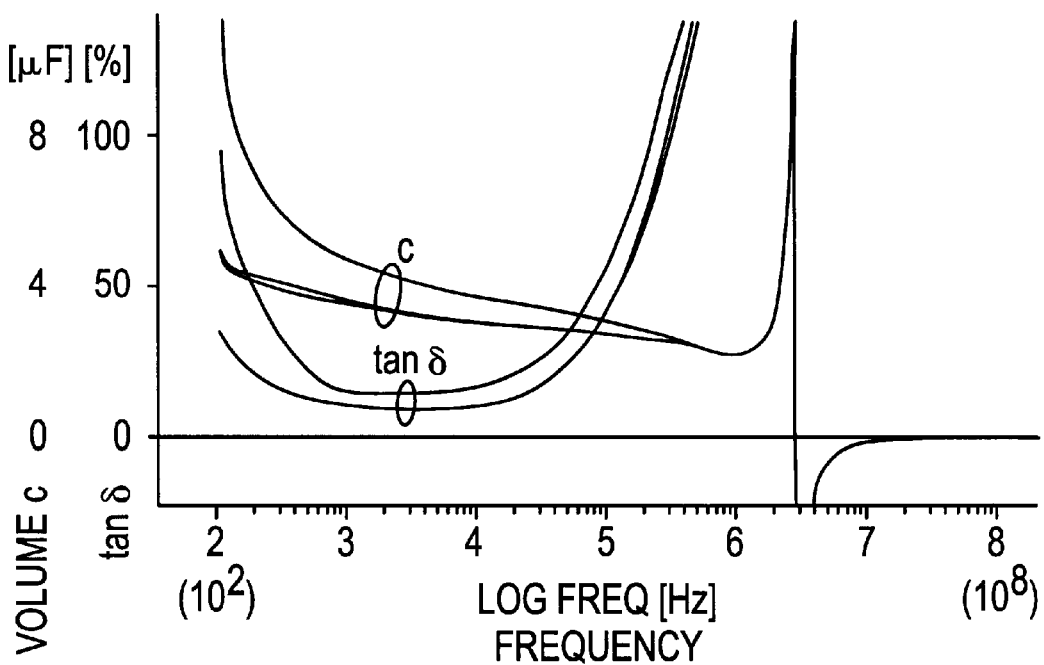
FIG. 2(b) is a graph showing changes dependent on frequency in capacity and tan δ of a Nb capacitor prepared by a process of Example 1 in which heat treatment was done at temperatures not less than 200° C. after preparing a solid electrolyte layer.

FIG. 2(a) shows the electrostatic capacity and the frequency response of dielectric loss (tan δ) that a Nb capacitor has which was molded for implementation and used after preparing without heat-treating subsequently to forming the solid electrolyte layer and then left to stand at room temperatures. In these measurements, bias voltage was not applied. Abnormal behavior, i.e., the maximum value near 1 kHz ($10^3$ $H_z$) is observed in FIG. 2(a). In contrast to this, as shown in FIG. 2(b), in the case of Example 1 where heat treatment had been applied at temperatures not less than 200° C. at least one time after the step successive to forming the solid electrolyte layer, the abnormal behavior was restrained and never appeared.

Figure 3:
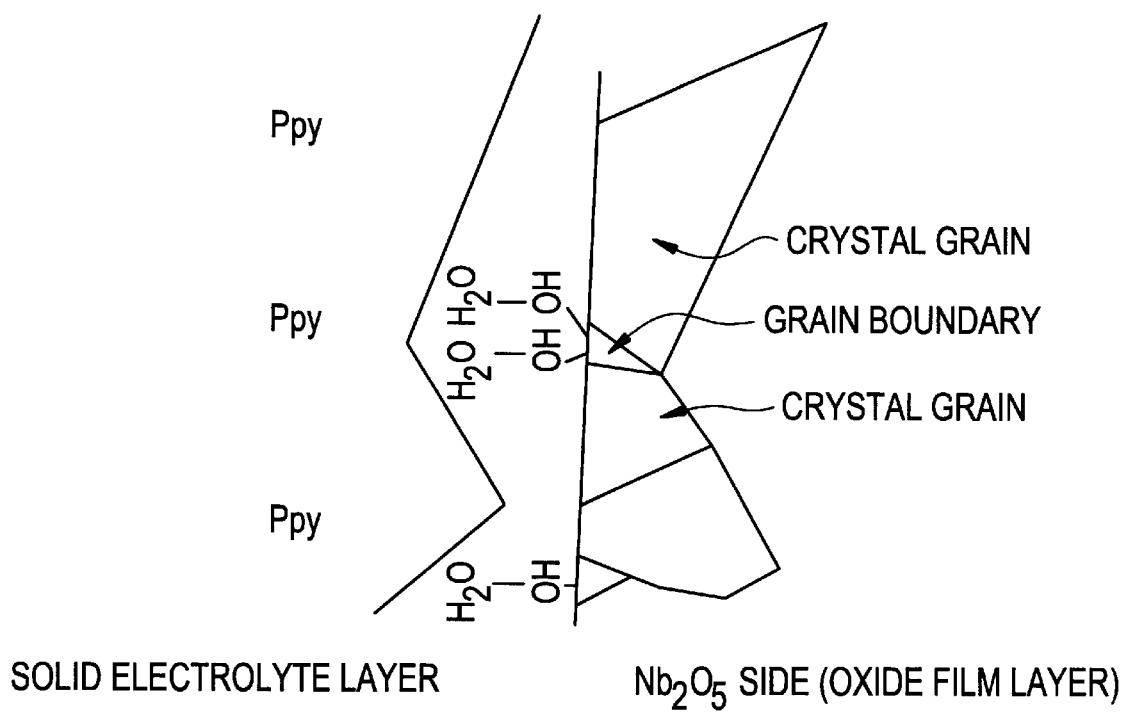
FIG. 3 is a schematic view showing one example of the interface between a Nb-oxide layer and a solid electrolyte layer.

This reason can be explained as follows. It is considered that this heat treatment removes absorbed water existed on the surface of the Nb-oxide film. As shown in FIG. 3, the defects on a Nb-oxide film, which is the Nb-oxide layer, are considered to be positioned at the grain boundary spot etc. where it is apt to adsorb water and etc. because they are active in terms of energy.

This absorbed water layer has blocked close contact between the Nb-oxide film and the solid electrolyte layer of polypyrrole (Ppy) etc. Further, this water molecules act as dipoles and causes such phenomenon that electrostatic capacity is changed depending on frequency variation applied from outside (this is called dielectric dispersion). The heat treatment removes this absorbed water to cause the oxide film and the solid electrolyte layer to contact with each other more closely. Thus, it is made possible to restrain the abnormal behavior of dielectric loss (tan δ). Accordingly, the capacity is stabilized.

Comparative Example 1

Constitution of Comparative Example 1

As a manufacturing process of this comparative example, a process for preparing a solid electrolytic capacitor is employed in which Ta is used for an anode body. Namely, all the preparing procedures of this comparative example including preparing steps and etc. are nearly the same as those of the above described Example 1 except using Ta for an anode body and Ta wire in place of Nb wire.

Explanation of Operation Performed in Comparative Example 1

This is almost the same as the above Example 1, which has been already explained, also in the case where Ta is used for an anode body.

Explanation of Effects Shown by Comparative Example 1

Figure 4A:
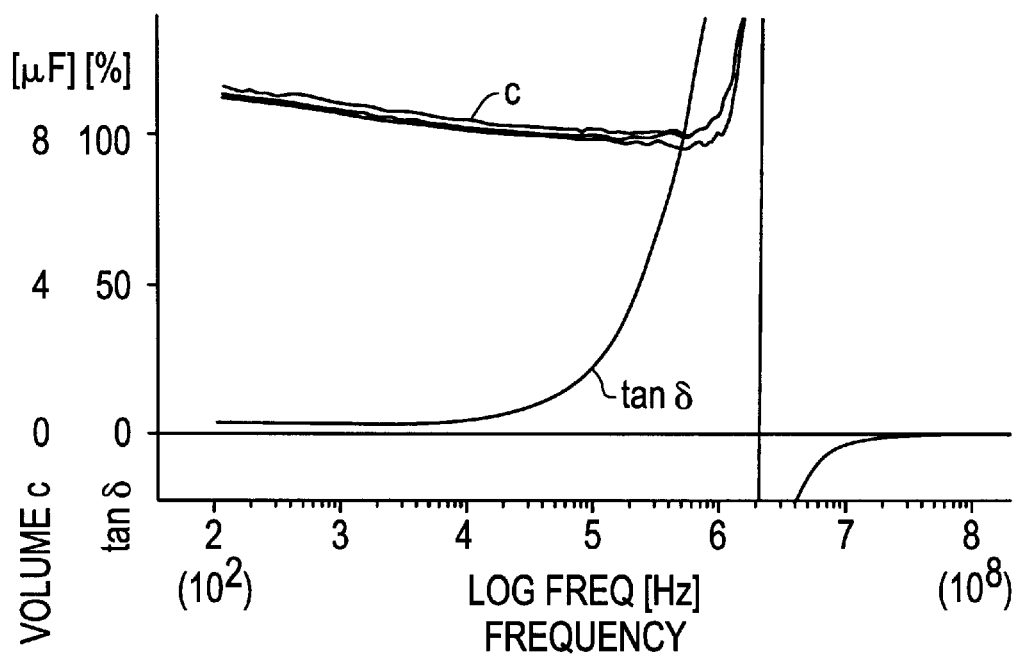
FIG. 4(a) is a graph showing changes dependent on frequency in capacity and tan δ of a Ta capacitor prepared without heat-treating at temperatures not less than 200° C. after preparing a solid electrolyte layer.
Figure 4B:
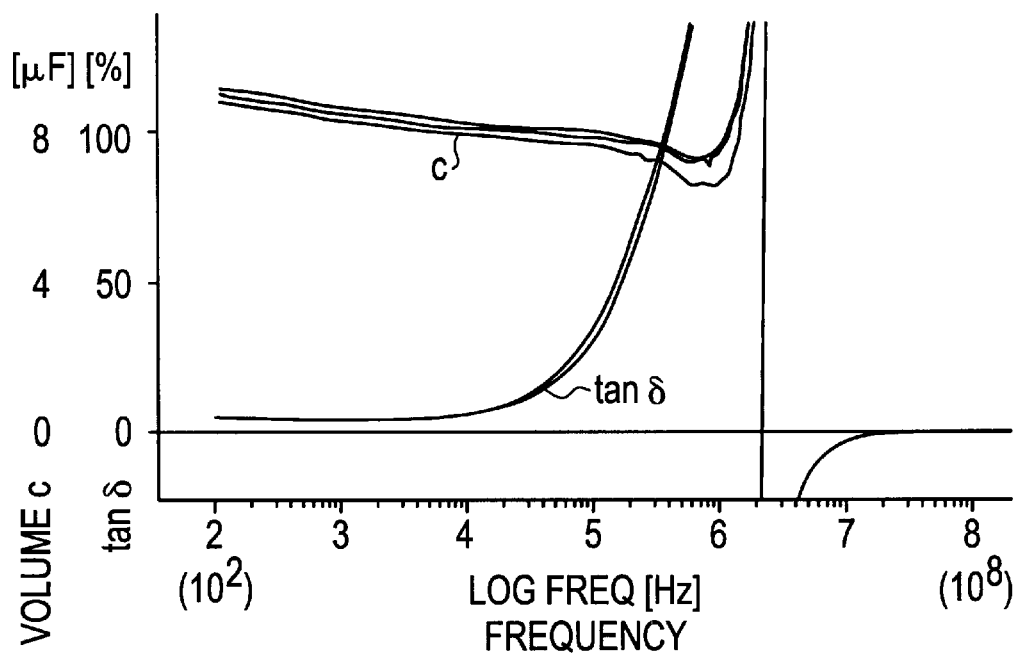
FIG. 4(b) is a graph showing changes dependent on frequency in capacity and tan δ of a Nb capacitor prepared by heat-treating at temperatures not less than 200° C. after preparing a solid electrolyte layer.

As shown in FIGS. 4(a) and (b), there is no observation, in the Ta capacitor prepared in the same manner, of the abnormal behavior regarding dielectric loss (tan δ) which is observed in the Nb capacitor. FIG. 4(a) is a graph showing electrostatic capacity and the frequency response of dielectric loss (tan δ) of the Ta capacitor prepared by not treating by heat at temperatures not less than 200° C. after forming the solid electrolyte layer. FIG. 4(b) is a graph showing electrostatic capacity and the frequency response of dielectric loss (tan δ) of the Ta capacitor prepared by treating by heat at temperatures not less than 200° C. after forming the solid electrolyte layer.

When comparing FIG. 2(a) and FIG. 4(a), the abnormal behavior regarding the frequency response of dielectric loss (tan δ) is considered to be a phenomenon specific to a Nb capacitor. This is considered to be presumed as follows. There are many grain boundaries, lattice defects and the like on the surface of the Nb-oxide film as compared with the surface of the Ta-oxide film so that the abnormal phenomenon is observed.

Example 2 and Comparative Example 2

Constitutions of Example 2 and Comparative Example 2

As explained in comparative Example 1, a peculiar behavior of dielectric loss cannot be observed in the Ta capacitor, i.e., solid electrolytic capacitor in which Ta is used for an anode body. However, there are some cases where heat is applied to the solid electrolytic Nb capacitor in its preparing process as well other than that applied in the aforementioned heat-treating step. For example, coating and baking the Ag paste would fall in such cases. The baking temperatures at this time are lower than the heat-treating temperature of 200 to 240° C. employed in the above Example 1. However, there are some cases where heat is applied for a long period of time, e.g., for 10 minutes. Then, it was investigated how much degree of a temperature is required for beginning to give an effect on the behavior of the dielectric loss in the case of changing temperatures to be raised without changing heat-treating times. The process for preparing used samples is the same with that of the above Example 1.

Explanation of Operations Performed in Example 2 and Comparative Example 2

The same procedure of Example 1 was repeated except changing temperatures of heat to be applied as follows. Namely, not heat-treating (Comparative Example 2-1), 150° C. (Comparative Example 2-2), 180° C. (Comparative Example 2-3), 200° C. (Example 2-1) and 220° C. (Example 2-2).

Explanation of Effects Shown by Example 2 and Comparative Example 2

Figure 5:
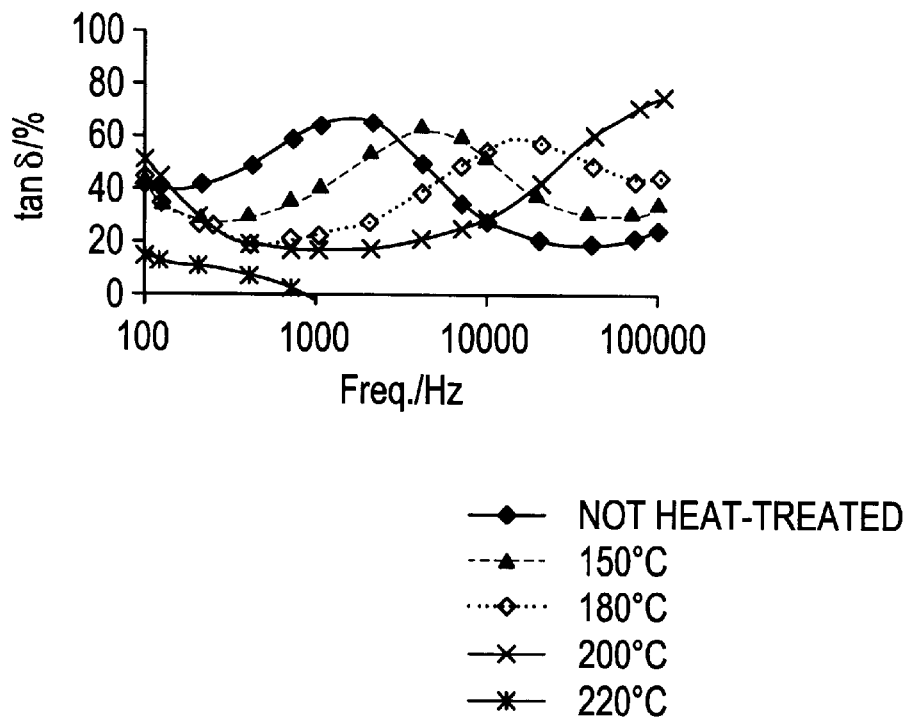
FIG. 5 is a graph showing the relation of heat-treating temperatures and dielectric loss.

The results in the case of changing the heat-treating temperatures are shown in FIG. 5. As shown in FIG. 5, a peculiar peak (a maximum value) in terms of the frequency-dependent change of dielectric loss was observed at heat-treating temperatures of 150° C. (in comparative Example 2-2) and 180° C. (in Comparative Example 2-3). There was no peak observed at 200° C. (in Example 2-1) and values were continuously increased, in which the frequency-dependent change was the same as that in the Ta capacitor. At 220° C. (In Example 2-2), the values of dielectric loss were continuously decreased, resulting in no peak at all. From these results, it is considered that temperatures influence dielectric loss rather than times.

Example 3

Constitutions of Example 3

In Example 2 and Comparative Example 2, temperatures of the heat treatment were discussed. In this example, influences were studied in the case of changing the atmosphere in heat-treating. The heat treatment of Example 1 was practiced in the air as explained in Example 1. In contrast to this, in this example, heat treatment was tried to be practiced in dry nitrogen taking into consideration the fact that the air contains water though it may be little. Other preparing procedures are the same as those of Example 1 aforementioned.

Explanation of Operations Performed in Example 3

The same procedure as Example 1 was repeated except heat-treating not in the air but in a nitrogen atmosphere. Other conditions are the same with those of the above described Example 1.

Explanation of Effects Shown by Example 3

When the heat treatment was practiced in the nitrogen atmosphere, the abnormal behavior of dielectric loss was suppressed. Water in the nitrogen is less than in the air, which fact is considered to have resulted in a still more effect.

Comparative Example 3

Constitution of Comparative Example 3

As explained in the above described Example 1, in the solid electrolytic Nb capacitor, heat treatment is effective for stabilizing the behavior of dielectric loss and electrostatic capacity if it was done during the steps after preparing the solid electrolyte layer, i.e., from forming graphite and Ag layers to molding-emplementation. In contrast to this, the same heat treatment is done before these steps. It was studied what behavior is observed in the behavior of dielectric loss under this condition. Heat treatment was practiced by using sample A obtained before forming the solid electrolyte layer but after formation in the process for preparing the solid electrolytic Nb capacitor. The steps until formation were the same as those of Example 1 aforementioned.

Explanation of Operations Performed in Comparative Example 3

The same procedure as Example 1 was repeated to the aforementioned sample A.

Explanation of Effects Shown by Comparative Example 3

Figure 6:
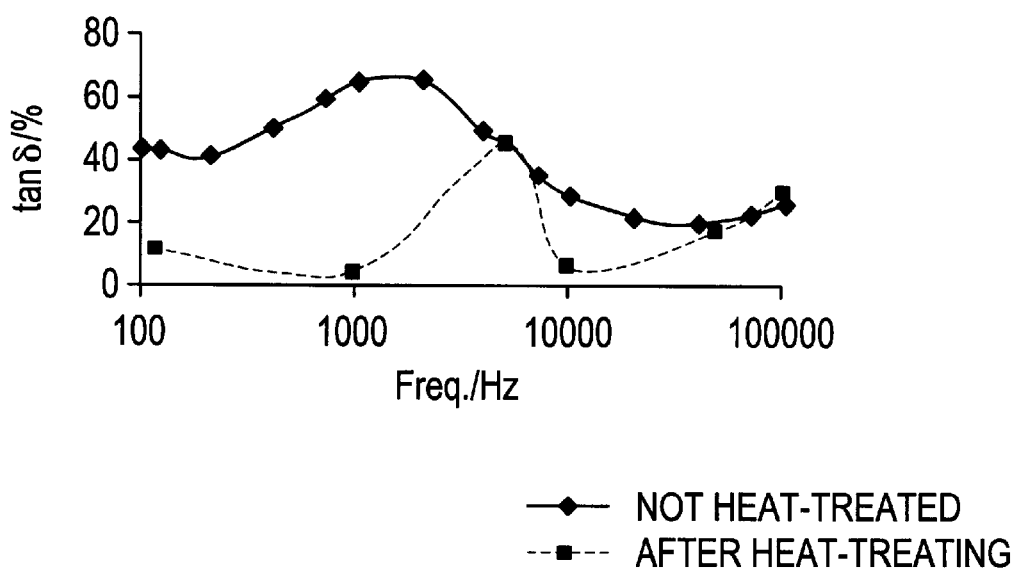
FIG. 6 is a graph showing the relation of dielectric loss of a Nb capacitor prepared by heat-treating at temperatures not less than 200° C. before preparing a solid electrolyte layer.

If the aforementioned sample A was heat-treated after the molding step, changes in the frequency response of dielectric loss were observed as shown in FIG. 6 even in the case of preparing the capacitor by using this sample A, and an abnormal peak of dielectric loss appeared in spite of the heat treatment. From this result, it has turned out that heat treatment before forming the solid electrolyte layer cannot restrain the abnormal behavior of dielectric loss, i.e., heat treatment before the solid-electrolyte-layer-forming step is not effective.

The meritorious effects of the present invention are summarized as follows.

As explained in the above, according to the process for preparing the solid electrolytic Nb capacitor of the present invention, the abnormal frequency characteristics of dielectric loss (tan δ) or dielectric dispersion are restrained. Thereby, a solid electrolytic Nb capacitor whose electrostatic capacity is stable can be prepared.

The reason is based on the specific process for preparing the solid electrolytic Nb capacitor of the present invention. Namely, the solid electrolytic Nb capacitor is obtained in this process by forming a laminating film or laminating films on a first laminate including the Nb anode body, Nb-oxide layer and solid electrolyte layer formed on the Nb-oxide layer. This process further includes the step of removing absorbed water remained between the Nb-oxide layer and the solid electrolyte layer existed in the first laminate or a second laminate which includes the aforementioned first laminate and one or more layers of the laminating film.

In the solid electrolytic Nb capacitor of the present invention, the abnormal frequency characteristics of dielectric loss (tan δ) or dielectric dispersion are restrained, thereby, resulting in a stabilized electrostatic capacity. The first reason of this is because the solid electrolytic Nb capacitor of the present invention is prepared by the process for preparing the solid electrolytic Nb capacitor of the present invention, and the absorbed water remained between the Nb-oxide layer and the solid electrolyte layer was removed. The second reason of this is because the solid electrolytic Nb capacitor of the present invention is a solid electrolytic Nb capacitor including the Nb anode body, Nb-oxide layer and solid electrolyte layer formed on the Nb-oxide layer, and treated so as to be substantially freed from water absorbed between the Nb-oxide layer and the solid electrolyte layer.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A solid electrolytic Nb capacitor comprising:
   a Nb anode body, a Nb-oxide layer and a solid electrolyte layer formed on said Nb-oxide layer;
   wherein there is no water absorbed on said Nb-oxide layer between said Nb-oxide layer and said solid electrolyte layer.

2. A process for preparing a solid electrolytic Nb capacitor comprising the steps of:
   forming a laminating film or laminating films on a first laminate comprising a Nb anode body, a Nb-oxide layer and a solid electrolyte layer formed on said Nb-oxide layer, and
   removing absorbed water remained between said Nb-oxide layer and said solid electrolyte layer existed in said first laminate or a second laminate comprising said first laminate and one layer or more of said laminating film.

3. The process as defined in claim 2, where in said absorbed water is removed by heat-treating said first laminate or said second laminate.

4. The process as defined in claim 3, wherein said first laminate or said second laminate is heat-treated at temperatures not less than 200° C.

5. The process as defined in claim 3, wherein first laminate or said second laminate is heat-treated in a low moisture atmosphere.

6. The process as defined in claim 4, wherein first laminate or said second laminate heat-treated in a low moisture atmosphere.

7. A solid electrolytic Nb capacitor prepared by the process as defined in claim 2, wherein absorbed water has been removed which remained between said Nb-oxide layer and said solid electrolyte layer.

* * * * *